Nov. 22, 1938.　　　　　F. KLUTKE　　　　2,137,846
MEASURING INSTRUMENT FOR ALTERNATING CURRENT CIRCUITS
Filed Feb. 25, 1937
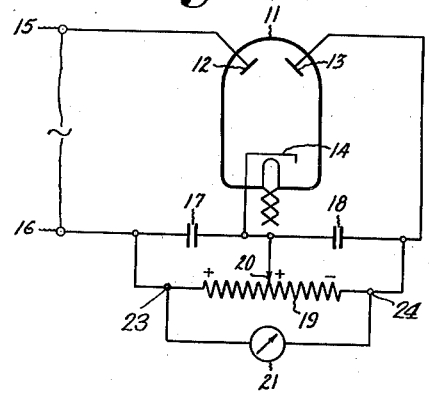
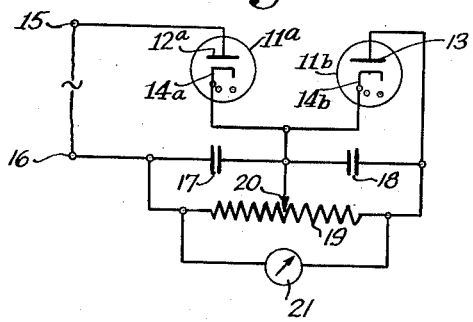
Inventor:
Fritz Klutke,
by Harry E. Dunham
His Attorney.

Patented Nov. 22, 1938

2,137,846

UNITED STATES PATENT OFFICE 2,137,846

MEASURING INSTRUMENT FOR ALTERNATING CURRENT CIRCUITS

Fritz Klutke, Berlin-Johannisthal, Germany, assignor to General Electric Company, a corporation of New York Application February 25, 1937, Serial No. 127,728
In Germany March 24, 1936

5 Claims. (Cl. 171—95)

My invention relates to measuring devices and concerns particularly measuring devices of the discharge tube type for use with alternating-current circuits.

It is an object of my invention to provide an instrument having a scale expanded at the lower end.

Another object of my invention is to provide measuring apparatus of the discharge tube type which requires no filters or other auxiliary apparatus and no auxiliary power source, and in which the possibility of zero shift introduced by the use of B batteries is eliminated since no B batteries are required.

Still another object of the invention is to obtain neutralization of the residual current in discharge tube measuring devices.

Other and further objects and advantages will become apparent as the description proceeds.

The invention may be understood more readily from the following detailed description when considered in connection with the accompanying drawing and those features of the invention which are believed to be novel and patentable will be pointed out in the claims appended hereto. In the drawing Fig. 1 is a schematic diagram of one embodiment of my invention illustrating the electrical circuits and Fig. 2 is a schematic diagram of a modified form of my invention.

Referring now more in detail to the drawing, I employ a pair of diode elements, one of which serves as a rectifier and the other of which serves as a compensator for residual current. I have illustrated a double-element vacuum tube 11 containing a pair of anodes 12 and 13 cooperating with a common cathode 14 and enclosed within a single envelope. It will be understood, of course, that separate tubes 11a and 11b might also be employed, in which case, there will of necessity be separate cathodes 14a and 14b which will be electrically joined by connections exterior to the envelopes, thus making the cathodes 14a and 14b unitary electrically. The cathode 14 is, in the arrangement shown, of the indirectly heated type.

The alternating voltage to be measured is applied between the pair of terminals 15 and 16, one of which is connected to the anode 12 and the other of which is connected in series with a condenser 17 to the cathode 14. It will be familiar to those skilled in the art that, in diode tubes, certain residual current flows even when no voltage is applied in the plate or anode circuit. For the purpose of compensating the residual current between the electrodes 12 and 14, a second diode element consisting of the electrodes 13 and 14 is used. Thus, no complicated filtering circuit is required for supplying pure direct current which would be necessary for compensation. A condenser 18 is connected between the electrodes 13 and 14, and a resistor 19 with a variable tap 20 is so connected as to bridge the condensers 17 and 18. The tap 20 is connected to the cathode 14 of the double-diode tube 11. A current-responsive instrument of suitable type, such as a d'Arsonval or other sensitive type instrument, responsive to direct current is connected across the ends of the resistor 19.

If it be assumed that the terminals 15 and 16 are short-circuited, a feeble residual current will tend to flow through the diode-tube element represented by the electrodes 12 and 14. However, the effect of this residual current will be compensated by the residual current flowing between the electrodes 13 and 14 by reason of the symmetric connection of the instrument 21 to the resistor 19. For the purpose of obtaining accurate compensation in individual cases to overcome irregularities in manufacture, the tap 20 is adjustable for exact zero adjustment of the instrument 21.

When an alternating voltage is applied between the terminals 15 and 16, rectified direct current tends to flow, which is superimposed upon the residual current between the electrodes 12 and 14. A path for this current is provided by the left-hand portion of the resistor 19. However, some of the current also flows through the right-hand portion of the resistor 19 and the instrument 21, thereby providing an indication of the magnitude of the voltage applied to the terminals 15 and 16. The potential difference due to current flow in the right-hand portion of the resistor 19 partially cancels the potential difference in the left-hand portion of the resistor 19. This effect becomes greater, the greater the magnitude of the voltage to be measured. Accordingly, the measurement provided by the deflection of the instrument 21 becomes less and less sensitive with increasing alternating voltages. In other words, the lower portion of the scale is expanded and very small alternating currents or voltages may be measured with great accuracy. The interposition of the condensers 17 and 18 forces the direct-current to flow through the resistor 20 and thus forces the direct-current to affect the current-responsive instrument 21. The presence of the condensers 17 and 18, however, offers no appreciable interference to the flow of alternating-current. Consequently, any inductive characteristics which the resistor 19 or the instrument 21 may have do not affect the alternating-current circuit to which the terminals 15 and 16 are connected.

From the foregoing explanation it is apparent that the diode element 12—14 is, in effect, connected in series with the right-hand portion of the resistor 19, the instrument 21 and the alternating-current input terminals 15 and 16. Likewise, the diode element 13—14 is shunted across the instrument 21 through the left-hand portion of the resistor 19. It is also apparent that the polarities of the diode elements with respect to the instrument 21 are opposite. That is, the anode sides of the two diode elements are connected to opposite terminals of the instrument 21.

The instrument 21 and the resistor 19 together may be regarded as a differential direct-current measuring system having two opposing pairs of input terminals 20—23 and 20—24 through which current may be fed producing opposite deflections of the instrument 21.

Since there are no elements, such as B batteries, with variable characteristics to produce shift in zero and other changes in calibration, it will be apparent that my apparatus maintains its calibration with high accuracy.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Alternating-current responsive apparatus comprising in combination, a double-diode discharge tube having a cathode and a pair of anodes, a pair of condensers, a resistor with an adjustable tap, a direct-current responsive device, and a pair of terminals through which the measured quantity is to be applied to the apparatus, one of said terminals being connected to one of said anodes, one of said condensers being connected between the other of said terminals and said cathode, the second of said condensers being connected between the cathode and the remaining anode, said resistor being connected between the latter anode and the second terminal, said adjustable tap being also connected to the cathode, and said direct-current responsive device being connected in shunt with said resistor.

2. Alternating-current responsive apparatus comprising in combination, a pair of diode discharge tube elements including electrically unitary cathode means, each element containing an anode, a pair of condensers, a resistor with a tap intermediate the ends thereof, a direct-current responsive device, and a pair of terminals through which the quantity to be measured is applied to the apparatus, one of said terminals being connected to one of said anodes, one of said condensers being connected between the other of said terminals and said cathode means, the second of said condensers being connected between said cathode means and the remaining anode, said resistor being connected between said latter anode and the second terminal, said tap being connected to said cathode means, and said direct-current responsive device being connected in shunt with said resistor.

3. Alternating-current responsive apparatus comprising in combination a diode element serving as a rectifier for alternating current representing a quantity being measured, a pair of input terminals for the alternating-current representing the quantity being measured, a direct-current responsive instrument connected in series relationship with said terminals and said diode element to be responsive to currents therein, and a second diode element connected in shunt relationship to said direct-current responsive instrument in opposing relation to the first of said diode elements.

4. Alternating-current responsive apparatus comprising in combination, a pair of input terminals, a diode element serving as a rectifier for alternating currents representing the quantity to be measured, a resistor having a tap dividing it into two portions, one of said portions being connected in series with said diode element and said input terminals, a second diode element shunting the remaining portion of said resistor and a direct current responsive device connected across the entire resistor.

5. Alternating-current responsive apparatus comprising in combination, apparatus input terminals, a diode element having an anode and a cathode and serving as a rectifier for alternating-current, a differential direct-current measuring system having two pairs of input terminals, said apparatus input terminals being connected in series with said diode element and one of said pairs of measuring system input terminals, a second diode element having an anode and cathode and connected to the remaining pair of measuring system input terminals in opposing relationship to the first mentioned diode element.

FRITZ KLUTKE.